J. A. BYINGTON.
FRUIT DRYING MACHINE.
APPLICATION FILED FEB. 11, 1915.
1,158,980.
Patented Nov. 2, 1915.
3 SHEETS—SHEET 2.
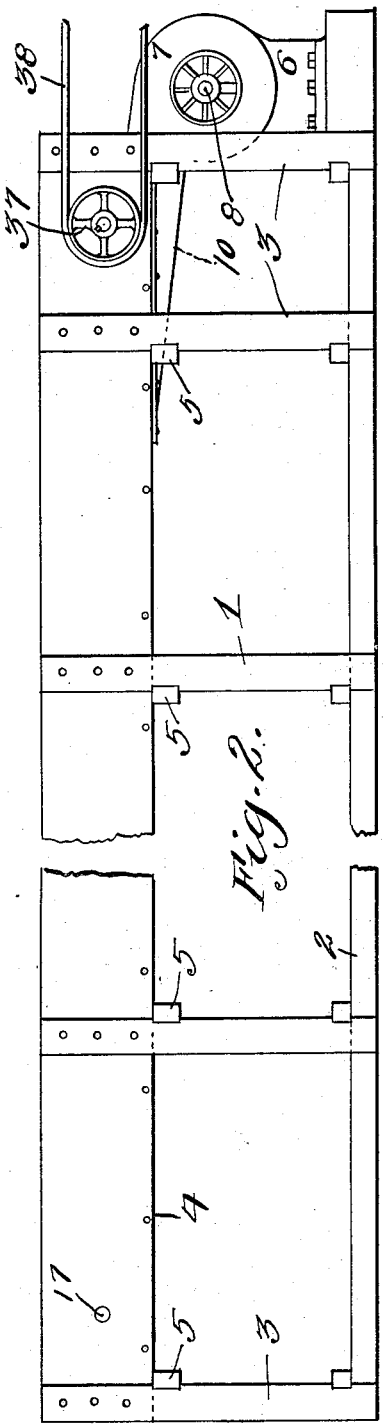
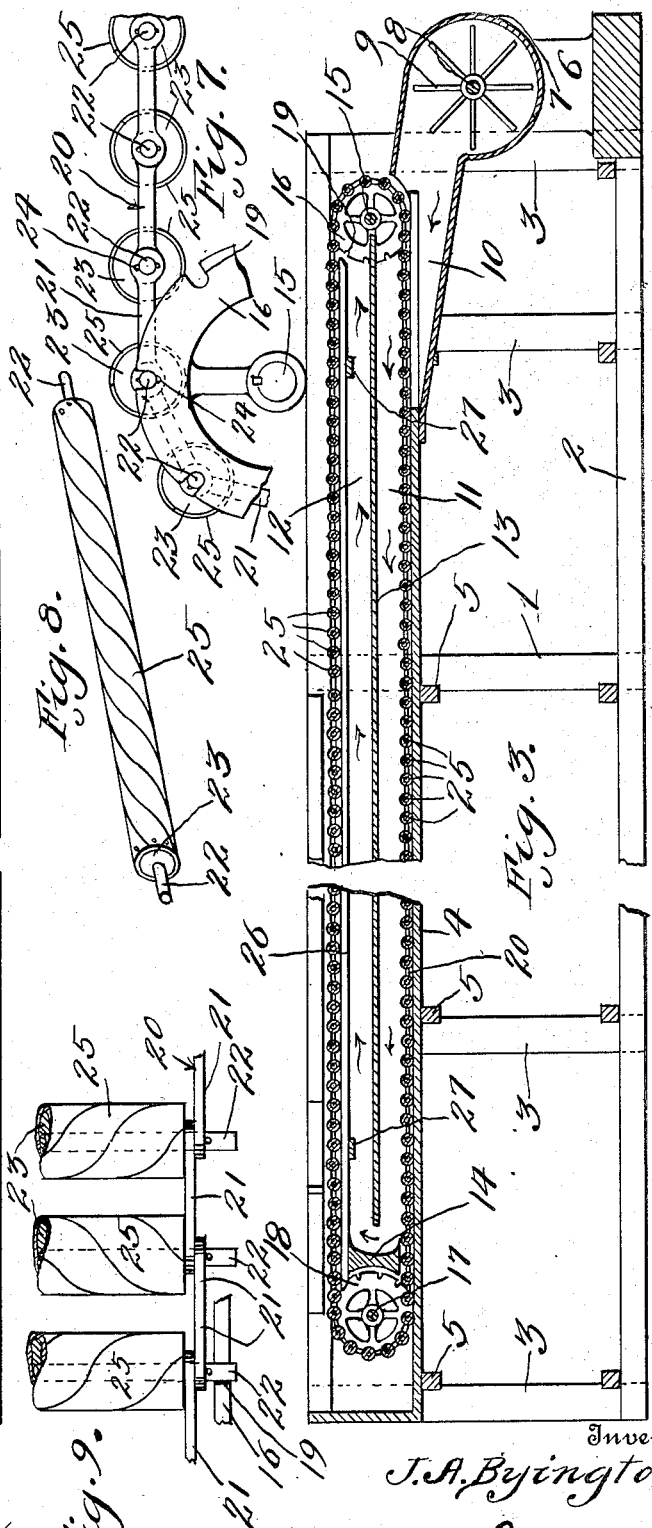
Inventor
J. A. Byington
By D. Swift & Co.
his Attorneys
Witnesses
Philip Turell
Francis J. Boswell

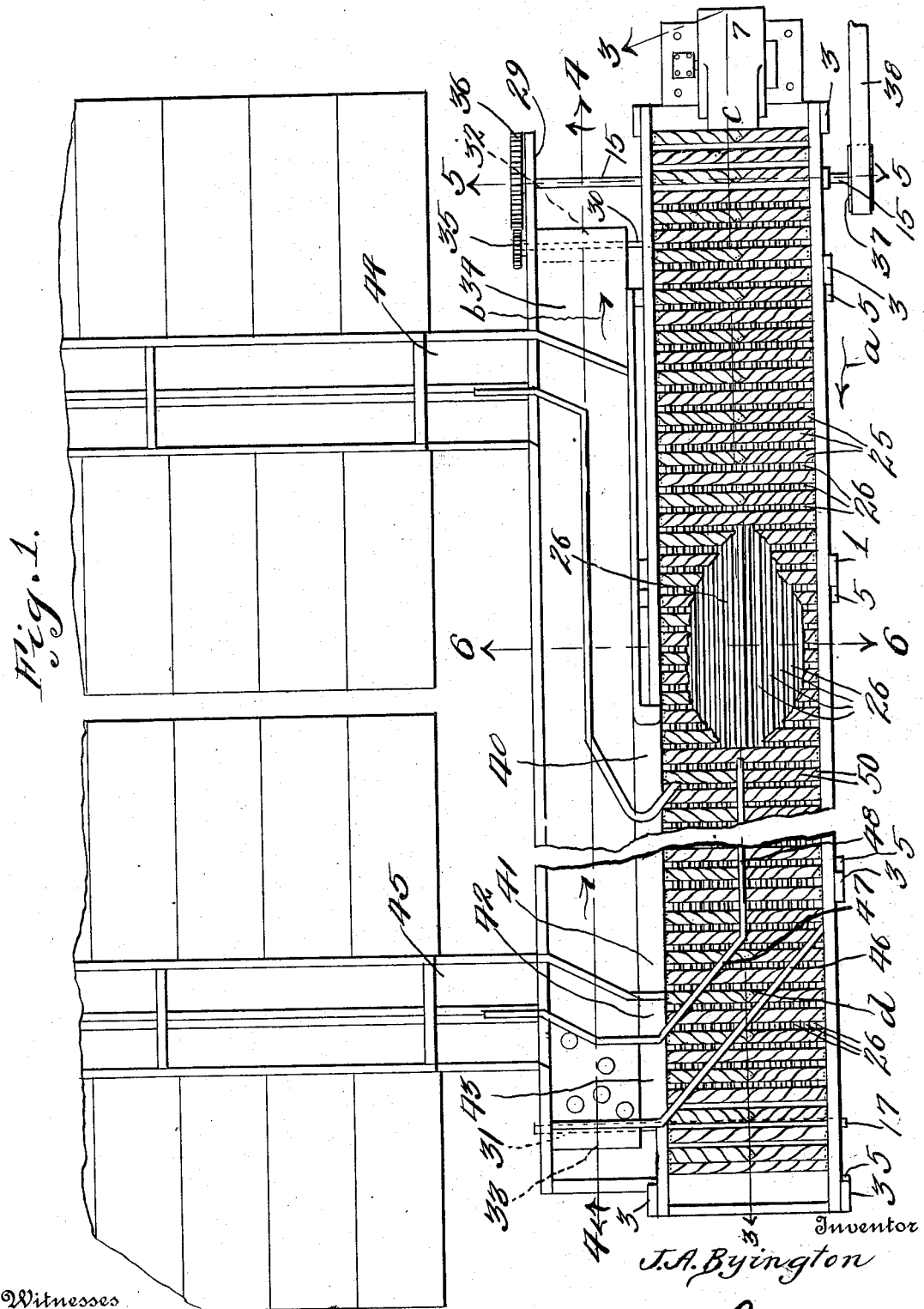

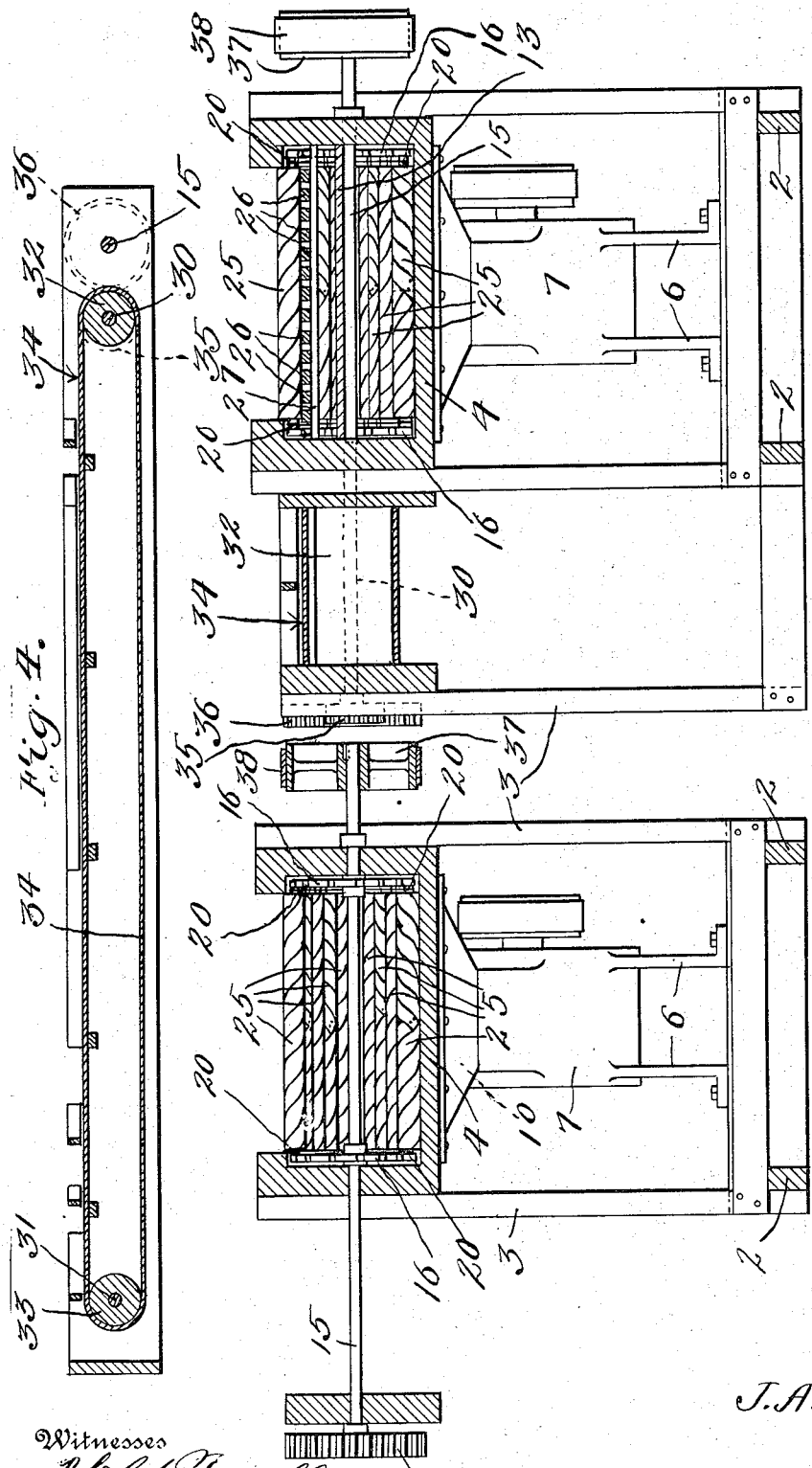

UNITED STATES PATENT OFFICE.

JAMES AUGUSTUS BYINGTON, OF JACKSONVILLE, FLORIDA.

FRUIT-DRYING MACHINE.

1,158,980.   Specification of Letters Patent.   Patented Nov. 2, 1915.

Application filed February 11, 1915. Serial No. 7,534.

*To all whom it may concern:*

Be it known that I, JAMES A. BYINGTON, a citizen of the United States, residing at Jacksonville, in the county of Duval and State of Florida, have invented a new and useful Fruit-Drying Machine; and I do hereby declare the following to be a full, clear, and exact description of the invention, such as will enable others skilled in the art to which it appertains to make and use the same.

This invention relates to an improved drying machine, for drying various fruits, such as oranges, grape fruit, tangerines and the like, and particularly used in packing houses for such citrus fruit when washed.

As one of the objects of the invention it is the aim to provide a machine of such nature and construction, as to eliminate the burden and expense of the use of heated air, and in lieu thereof the use of blasts of natural cold air.

A further object of the invention is to provide a combined drier and grading table, particularly of the roller type, which has been found to be the most practical and efficient method of grading and drying fruit. In other words, to consolidate a drying and grading table, making one machine answer or perform both purposes of drying and grading the fruit, in which case the machine will occupy less than one-half the floor space heretofore utilized.

As another object of the invention, it is the aim to provide a machine of this nature including a series of rollers covered with suitable absorbent material and arranged in sequence and likewise traveling, thereby providing an improved conveyer for safely and mechanically handling the fruit without bruising the same.

Another object of the invention is that by the provision of the absorbent material covering the rollers, all the moisture on the fruit subsequently to being washed is thoroughly absorbed by such rollers, in a very short space of time.

Another object of the invention is to provide a machine of this nature having air passages, through which an immense air draft or blast is passed, which not only thoroughly dries the rollers on their return travel, but is also deflected for assisting in drying the rollers on their forward travel. and especially dry the fruit, the rollers acting to absorb the greater part of the moisture, prior to the fruit being transferred to suitable sizing machines.

As a further object of the invention is to provide a machine having a greater capacity than similar machines, and owing to the absorbent material rollers, the fruit is not only more gently handled, but is safer in its transmission.

A further object of the invention is to provide a simple and efficient and practical construction.

In practical fields the details of construction may necessitate alterations, falling within the scope of what is claimed.

The invention comprises further features and combination of parts, as hereinafter set forth, shown in the drawings and claimed.

In the drawings:—Figure 1 is a plan view showing the improved combined fruit drying and grading machine arranged adjacent to a conveyer, which acts to transfer the fruit to suitable sizing machines for further treatment. Fig. 2 is a view in side elevation of the combined drier and grading machine. Fig. 3 is a longitudinal sectional view on line 3—3 of Fig. 1. Fig. 4 is a sectional view on line 4—4 of Fig. 1. Fig. 5 is a sectional view on line 5—5 of Fig. 1. Fig. 6 is a sectional view on line 6—6 of Fig. 1. Fig. 7 is a detail view, showing several of the absorbent material covered rollers joined together in sequence. Fig. 8 is a detail view of one of the absorbent material covered rollers. Fig. 9 is a plan view showing a part of the structure shown in Fig. 7 illustrating several of the rollers. Fig. 10 is a perspective view of another form of one of the absorbent material covered rollers 23.

Referring more especially to the drawings, 1 designates the main frame work comprising the base 2, the standard 3, and the upper trough frame 4, which is supported upon the transverse bars 5. Mounted upon one end of the base is a pedestal 6 having a blower fan casing 7, in which the shaft 8 of the blower fan 9 is mounted. The casing 7 is provided with a hollow extension 10 communicating with the trough frame 4, whereby as the fan (which is designed to be operated by any suitable means (not shown)) is operated an immense blast or draft of air is forced through the trough casing, which is divided into two chambers 11 and 12 by the partitions 13. The draft or blast of air passes through the chamber 11, and is deflected by the deflector plate 14 into the chamber 12. In bearings of one end of the trough frame a shaft 15 is mounted having sprocket wheels 16, one at each end. Mounted in bearings of the other end of the trough frame is a shaft 17, likewise provided with sprockets 18, one upon each end. The rim of each sprocket 16 and 18 is provided with a plurality of semi-circular bearings 19. A pair of chains 20 is provided, and each consists of a series of links of the type and construction shown in the drawings, particularly in Fig. 7. However, these links 21 may be of any suitable or conventional construction. These links are connected together by the pintles 22 of the rollers 23, there being pins 24 to hold the pintles in place connecting said links. The rollers 23 extend from one chain to the other as shown, and are wrapped spirally by strips of suitable absorbent material 25, and are designed to travel upon the slats 26. These slats extend longitudinally of the trough frame, and are supported by the transverse bars 27, thereby providing the supporting surface or bed for the rollers. The rollers by means of their absorbent material, not only absorb the moisture from the fruit, but also act as conveying means, for conveying the fruit from one end of the machine to the other, while the same is being thoroughly dried by the draft of air. Also by the virtue of the rollers a suitable grading table is provided. The opposite sides of the trough frame have their upper edge portions extended above the surfaces of the rollers, as clearly shown, not only in Fig. 3, but also as shown in Figs. 5 and 6, so as to prevent the fruit and the like from displacement at the ends of the rollers. Mounted in bearings of the trough frame at its ends adjacent one side thereof, and in bearings of an additional frame 29 are shafts 30 and 31 having suitable rollers 32 and 33, over which the belt 34 travels. On one end of the shaft 30 is a gear 35, meshing with the gear 36 of one end of the shaft 15, the other end of which is provided with a pulley 37, designed to receive power from any suitable source (not shown) by means of the belt 38. It is to be noted that the drying or grading belt (which consists of the series of absorbent material covered rollers) is designed to travel in the direction of the arrow $a$, and owing to the intermeshing of the gears 36 and 35 the belt 34 travels in the opposite direction as indicated by the arrow $b$. This arrangement is for the purpose of carrying the fruit from the end $c$ of the roller conveyer to the end $d$, during which course of travel, the fruit not only dries off naturally, but the moisture is considerably absorbed by the absorbent material on the rollers, and when the fruit reaches the end $d$ it is graded and separated and deflected through the passages 40, 41, 42 and 43 on to the belt or conveyer 34, which transfers the same to the sizing machines 44 and 45, where the fruit is further handled in the usual manner, the sizing machines, it is to be noted, form no part of the present invention. The strips 46, 47 and 48 act to deflect and separate the fruit, in order to be transferred to the belt 34. As the fruit travels with the roller conveyer the air blast or draft percolates through the slats 26, and not only assist in drying the rollers as they move in the direction of the arrow $a$, but also assist in drying the fruit considerably, and as the rollers pass backwardly through the trough frame, that is, on the bottom thereof, they are thoroughly and completely dried by the draft or blast of air passing through the chamber 11.

It will be noted that every other roller is wrapped spirally from one end to the other with a strip of absorbent material, such as felt or the like, while the intermediate rollers have their strips of absorbent material wrapped spirally from their opposite ends toward their centers, and the slight selvage on the contacting adjacent edges of the strips cause partially raised portions 50, therefore owing to their spiral arrangement, the fruit in its travel from one end of the machine to the other is maintained centrally upon the roller conveyer, thereby preventing the fruit from considerably contacting with the sides of the trough. By the intermediate rollers being wrapped in this manner and the other rollers wrapped spirally from opposite ends, the rollers not only contact with the fruit, but also wipe the same, and at the same time a variable movement is imparted to each and every piece of fruit, in which case the fruit becomes thoroughly dry.

The invention having been set forth, what is claimed as new and useful is:—

1. In a fruit drier, a casing, an endless traveling conveyer mounted in the casing to convey the fruit from one end to the other, said conveyer comprising a plurality of rollers, each having a strip of spirally arranged absorbent material, each and every other roller having strips of absorbent material spirally arranged upon its opposite end in opposite directions toward the center thereof, the slight selvage of the adjacent edges of the strip forming raised parts, thereby causing the fruit to automatically center on the conveyer.

2. In a fruit drier, a casing divided into upper and lower chambers, an endless conveyer mounted in the casing and moving through said chamber, said conveyer comprising a series of absorbent material covered rollers to absorb the moisture from the fruit, and pneumatic means for not only drying the absorbent material of the rollers, but also assisting in drying the fruit, the absorbent material of each alternating roller being formed in strips wrapped spirally from its opposite end in opposite directions toward the center of the roller, the adjacent selvaged edges of the strips forming spirally arranged raised parts to maintain the fruit centered on the conveyer.

3. In a fruit drier, a supporting frame having a trough frame supported thereby, revoluble members mounted in each end of the trough frame, a fruit conveyer traveling about the members, said trough frame consisting of upper and lower chambers, in which the upper and lower parts of the conveyer travel, said conveyer comprising absorbent material covered rollers, a longitudinal slatted support for the rollers of the upper part of the conveyer to support the rollers, and pneumatic means for forcing an air blast through said chambers, to not only dry the rollers on their return movements, but on their forward movements, and also to assist in drying the fruit.

4. A fruit conveyer for fruit drying machines comprising endless chains, spaced rollers connecting said chains, each and every other roller having a strip of absorbent material wrapped in one direction from one end to the other, each alternating roller having two strips wrapped spirally from opposite ends of the rollers to opposite directions of the center of the roller, the selvaged adjacent edges of the oppositely arranged spiral strips causing spirally arranged raised parts to maintain the group centered on the conveyer.

In testimony whereof I have signed my name to this specification in the presence of two subscribing witnesses.

JAMES AUGUSTUS BYINGTON.

Witnesses:
 ALLARD CARLISLE,
 RICHARD M. HIGGINBOTHAM.